US009223086B2

(12) United States Patent
Fattal et al.

(10) Patent No.: US 9,223,086 B2
(45) Date of Patent: Dec. 29, 2015

(54) WAVEFRONT SYNTHESIZER SYSTEMS

(75) Inventors: David A. Fattal, Mountain View, CA (US); Marco Fiorentino, Mountain View, CA (US); Raymond G. Beausoleil, Redmond, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 327 days.

(21) Appl. No.: 13/991,853

(22) PCT Filed: Jan. 21, 2011

(86) PCT No.: PCT/US2011/022081
§ 371 (c)(1),
(2), (4) Date: Jun. 5, 2013

(87) PCT Pub. No.: WO2012/099606
PCT Pub. Date: Jul. 26, 2012

(65) Prior Publication Data
US 2013/0266254 A1 Oct. 10, 2013

(51) Int. Cl.
*G02B 6/12* (2006.01)
*G02B 6/35* (2006.01)
(Continued)

(52) U.S. Cl.
CPC .. *G02B 6/12* (2013.01); *G02B 6/35* (2013.01); *G02B 6/3544* (2013.01); *G02F 1/011* (2013.01);
(Continued)

(58) Field of Classification Search
CPC ...... G02B 6/12; G02B 6/12007; G02B 6/124; G02B 6/35; G02F 2203/15; G02F 2203/18; G02F 1/011; G02F 1/0147; G02F 1/025
USPC .................. 385/4–10, 31–32, 37, 39–43, 45, 385/49–50, 14–21
See application file for complete search history.

(56) References Cited

U.S. PATENT DOCUMENTS 4,893,353 A    1/1990 Iwaoka et al.
6,512,863 B1 *  1/2003 Lewis .................. G02B 6/3524
                                             385/18

(Continued)

FOREIGN PATENT DOCUMENTS

CN         1460869 A    12/2003
CN       101548403 A     9/2009
WO     WO-2008108822     9/2008

OTHER PUBLICATIONS

International Search Report, Nov. 21, 2011. PCT Application No. PCT/US2011/022081.

(Continued)

*Primary Examiner* — Akm Enayet Ullah
*Assistant Examiner* — Michael Mooney
(74) *Attorney, Agent, or Firm* — Olympic Patent Works PLLC

(57) ABSTRACT

Wavefront synthesizers and optical switches implemented with wavefront synthesizers are disclosed. In one aspect, a wavefront synthesizer includes a waveguide tree composed a root waveguide that branches into at least two terminus waveguides. The root waveguide is integrated with a source to inject light into the waveguide tree via the root waveguide. The synthesizer includes output couplers located at the ends of the terminus waveguides. Each output coupler outputs a wavefront associated with a portion of the light injected with at least two of the wavefronts overlapping to form at least one beam of light via constructive interference. The synthesizer also includes microring resonators disposed adjacent to the terminus waveguides. Each microring is independently tunable to apply a phase shift in the wavefront output from one of the output couplers to steer the direction of the beam and the at least two wavefronts.

15 Claims, 17 Drawing Sheets

(51) Int. Cl.
  *G02F 1/01* (2006.01)
  *G02F 1/025* (2006.01)
  *G02B 6/124* (2006.01)

(52) U.S. Cl.
  CPC .............. *G02F 1/0147* (2013.01); *G02F 1/025* (2013.01); *G02B 6/124* (2013.01); *G02B 6/12007* (2013.01); *G02F 2203/15* (2013.01); *G02F 2203/18* (2013.01)

(56) References Cited

U.S. PATENT DOCUMENTS

| | | | |
|---|---|---|---|
| 6,587,278 | B1 | 7/2003 | Ogawa et al. |
| 6,959,027 | B1 | 10/2005 | Guilfoyle et al. |
| 7,046,896 | B1 | 5/2006 | Gunn et al. |
| 7,599,587 | B2 * | 10/2009 | Nishizawa et al. ............. 385/18 |
| 7,646,942 | B2 | 1/2010 | Park et al. |
| 2009/0022500 | A1 | 1/2009 | Pinguet et al. |
| 2009/0185810 | A1 | 7/2009 | Kaplan et al. |

OTHER PUBLICATIONS

Xu, Q. et al., "Cascaded Silicon Micro-Ring Modulators for WDM Optical Interconnection," Optics Express, 14.20, 2006, pp. 9431-9435, available at http://www.owlnet.rice.edu/~qx1/Papers/Cascaded%20silicon%20micro-ring%20modulators%20for%20WDM%20optical%20interconnection.pdf.

\* cited by examiner

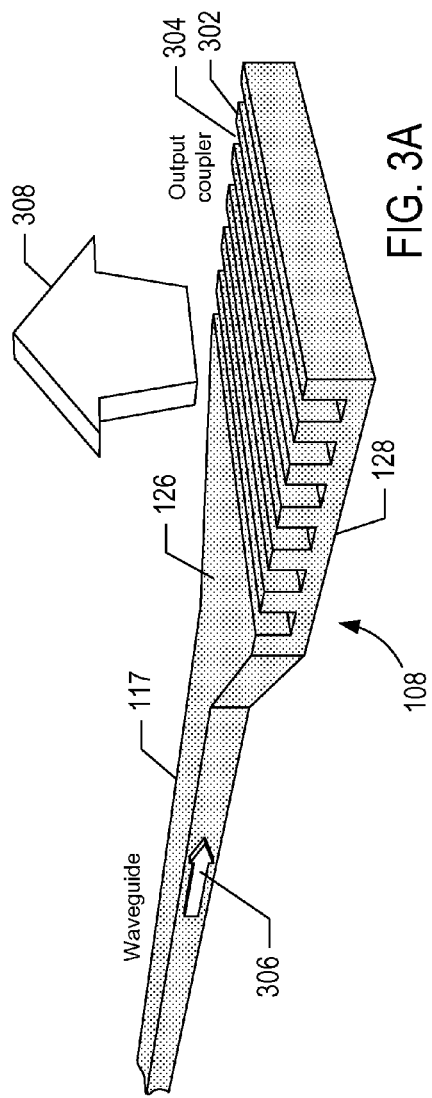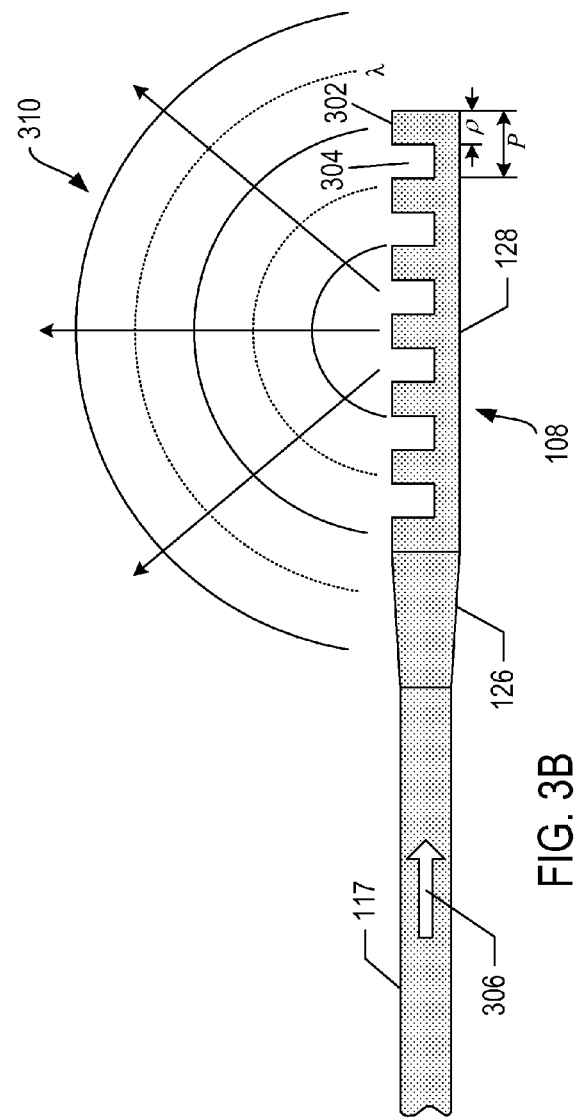

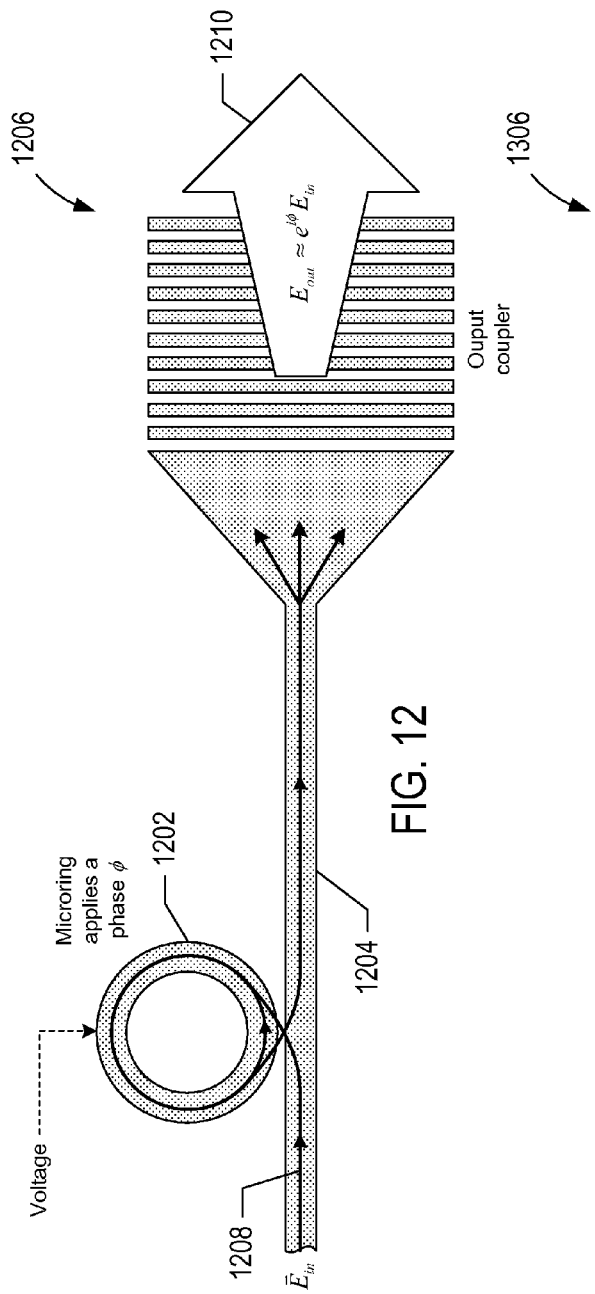
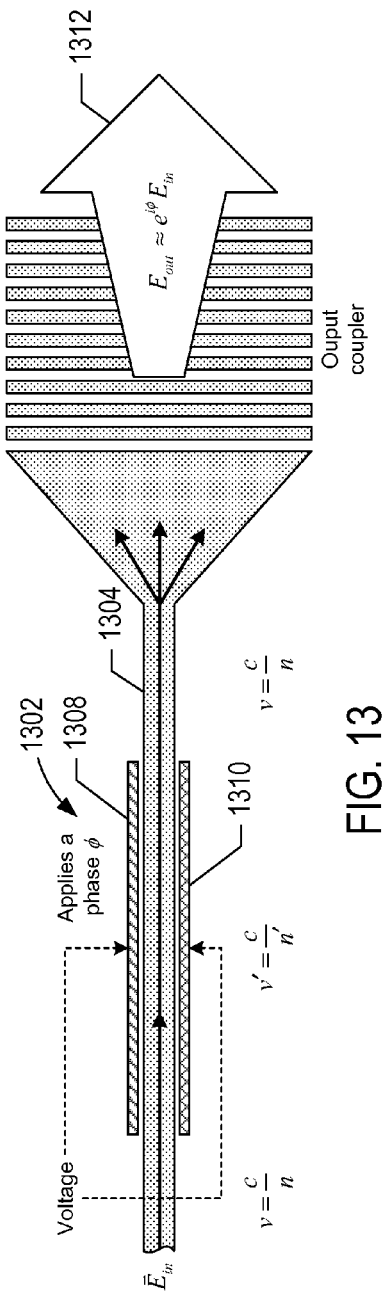
FIG. 12
FIG. 13

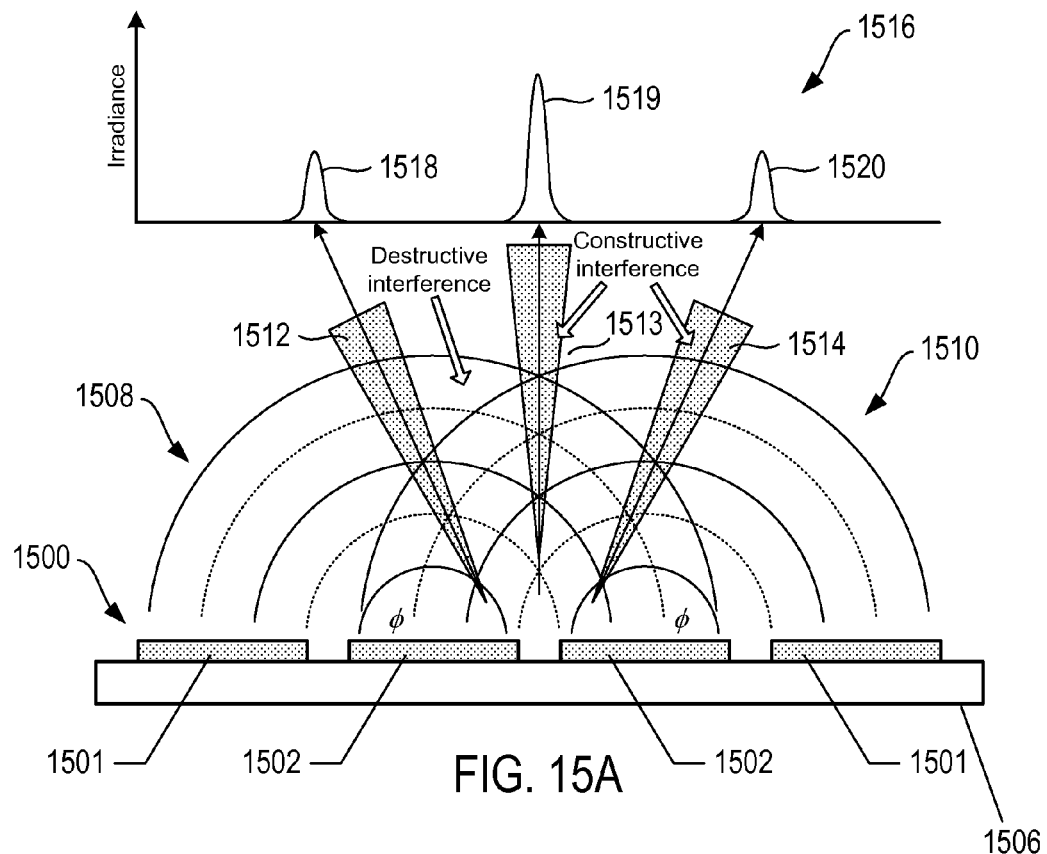
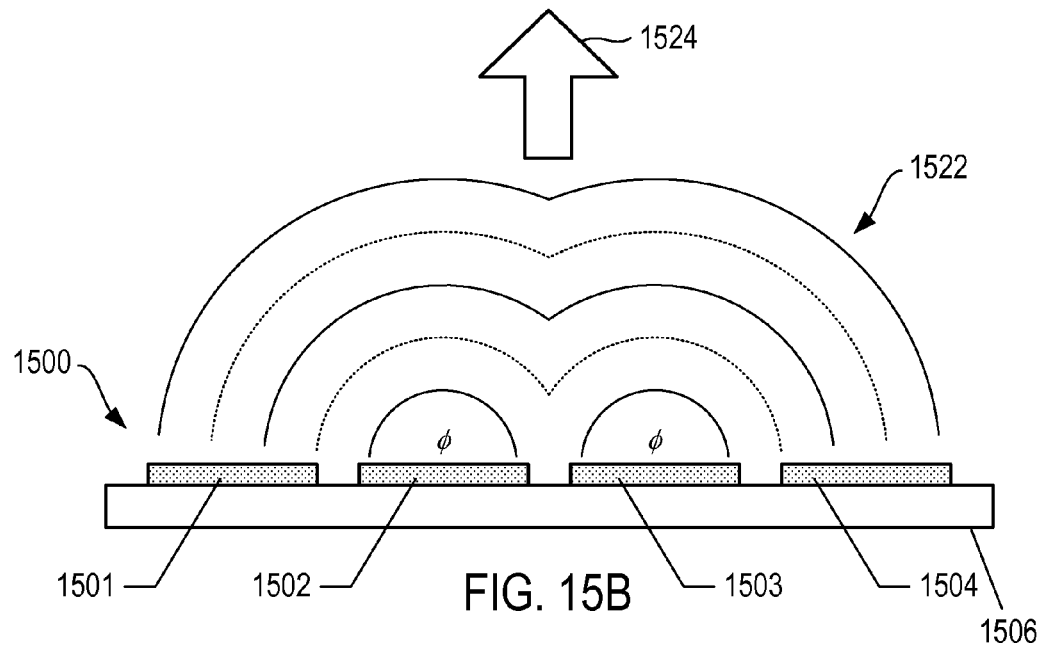
FIG. 15A
FIG. 15B

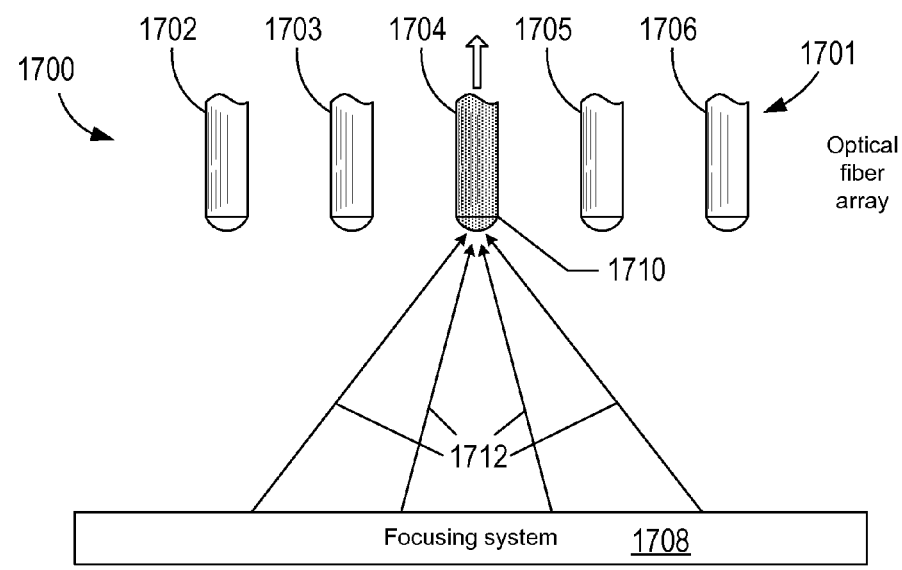
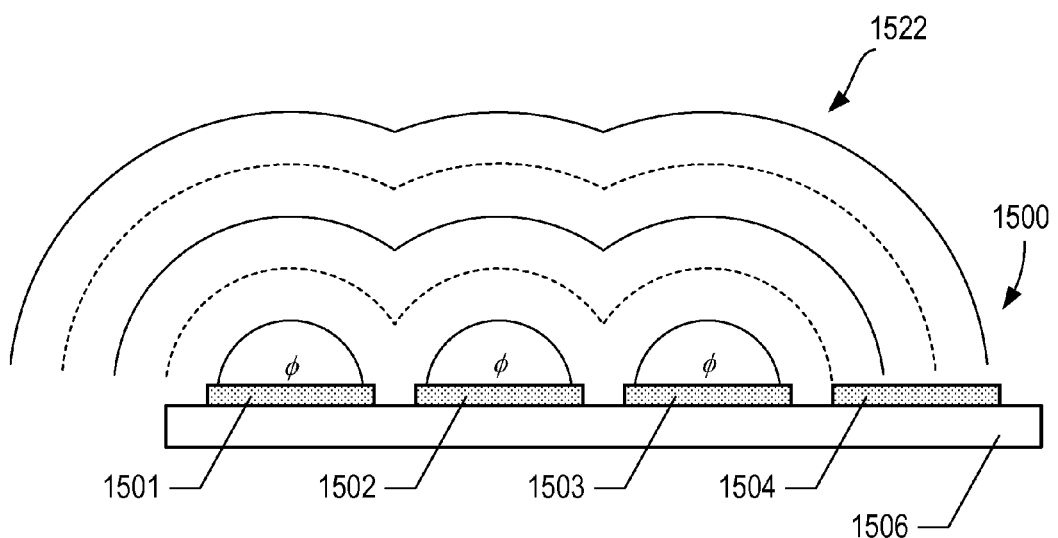
FIG. 17A

WAVEFRONT SYNTHESIZER SYSTEMS

TECHNICAL FIELD

This disclosure relates to optical interconnects and optical switches.

BACKGROUND

As Internet usage continues to increase so has the demand for rapidly channeling vast amounts of data. Because the majority of the data sent over the Internet is encoded in optical signals, surfing the Internet requires rapidly channeling optical signals from one optical fiber to another. In the past, this was accomplished at network hubs using electronic switches where optical signals were converted into electrical signals that were subsequently switched around electronically followed by converting the electrical signals back into optical signals to continue the journey. However, electronic switches were not up to the task of meeting future Internet demand, because the switches are bulky, slow, and require large amounts of power.

In recent years, this electronic bottleneck has, in part, been diminished with the introduction of optical switches. One example of an optical switch is implemented with microelectromechanical systems ("MEMS") technology. The ends of hundreds of incoming and outgoing optical fibers are capped with tiny lenses and mounted as an array in a surface of an optical switch assembly. The optical switch includes an array of MEMS micromirrors that faces the array of lenses and a mirror with a fixed orientation. Each micromirror is electronically controlled and can be independently reoriented. An optical signal enters the optical switch through an input optical fiber, where it bounces off a micromirror oriented to reflect the optical signal off of the fixed mirror toward another micromirror oriented to direct the optical signal into an output optical fiber. The micromirrors can be electronically reoriented on the order of milliseconds, enabling rapid switching of optical signals from input to output optical fibers without having to engage in the time and energy consuming process of converting the optical signals into electrical signals and back into optical signals. For example, an array of 256 micromirrors can be fabricated on less than one square inch of silicon. This compact array of micromirrors implemented in an optical switch provides greater than 32 times more switching density than a comparable electronic switch, and with no optical-electrical-optical conversion, the optical switch provides up to a 100-fold reduction in power consumption.

Although, many existing optical switches provide rapid switching of optical signals, data centers and the telecommunications industry continue to seek faster and more energy efficient optical switches to handle the ever increasing demand for rapidly channeling data in data centers and over the Internet.

BRIEF DESCRIPTION OF THE DRAWINGS

FIG. 3A shows an enlarged perspective view of an output coupler located at the end of a waveguide.

FIG. 3B shows a cross-sectional view of hemispherical contours that represent a spherical wavefront output from an output coupler.

FIG. 12 shows a top-view of an example microring and an output coupler associated with a terminus waveguide.

FIG. 13 shows an example of a tuning device disposed along a terminus waveguide.

FIGS. 15A-15D show an example steering two wavefronts output from two output couplers of a wavefront synthesizer

FIGS. 17A-17B show an example optical switch operated to inject an optical signal into two different optical fibers.

DETAILED DESCRIPTION

Figure 1:
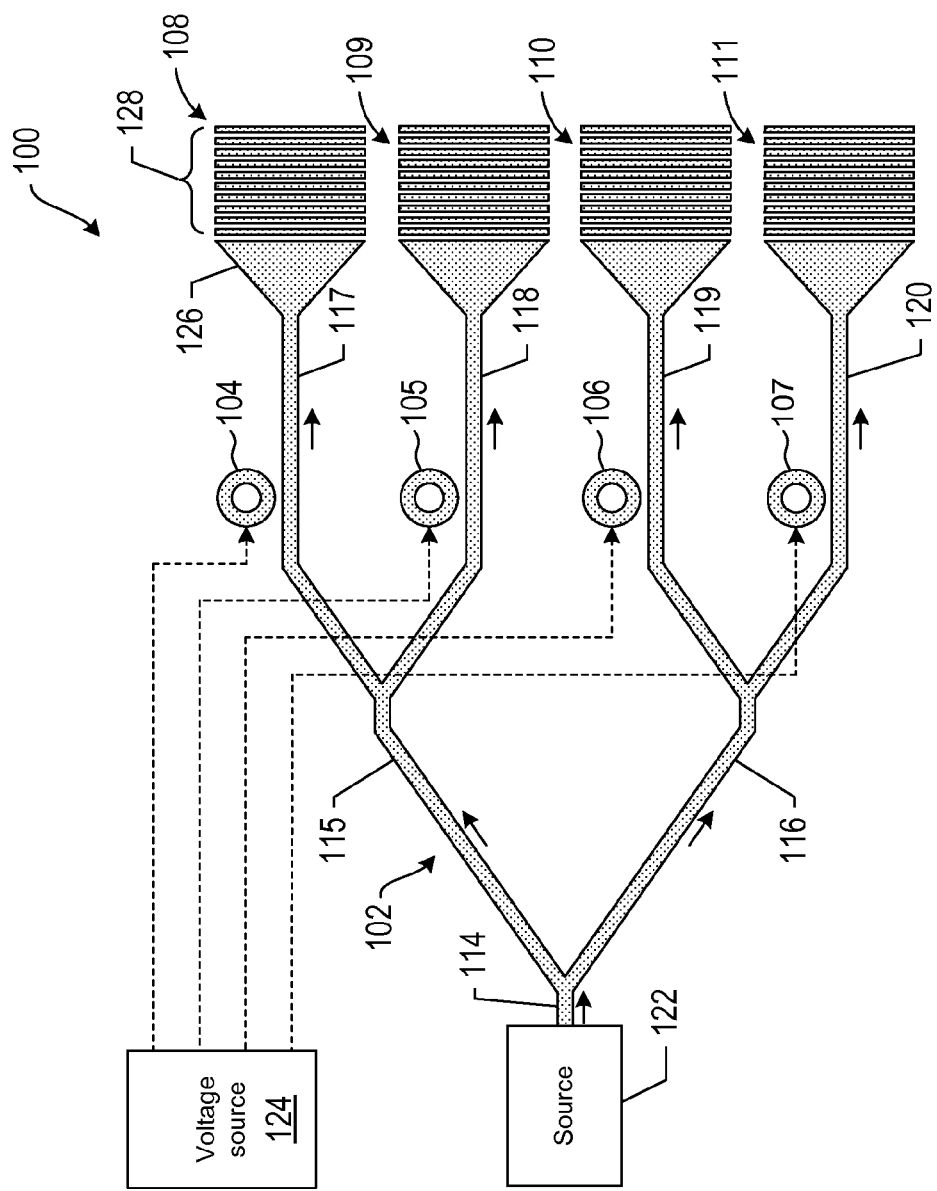
FIG. 1 shows a top-view schematic representation of an example one-dimensional wavefront synthesizer.

This disclosure is directed to wavefront synthesizers and to optical switches implemented with wavefront synthesizers. FIG. 1 shows a top view schematic representation of an example wavefront synthesizer 100. The synthesizer 100 includes a waveguide tree 102, four microring resonators 104-107, and four output couplers 108-111. The waveguide tree 102 has a symmetric binary structure including a root waveguide 114 that branches symmetrically via intermediate waveguides 115 and 116 into four terminus waveguides 117-120. Each terminus waveguide 117-120 terminates at one of the four output couplers 108-111. For example, intermediate waveguide 115 symmetrically branches into the two terminus waveguides 117 and 118.

Figure 2:
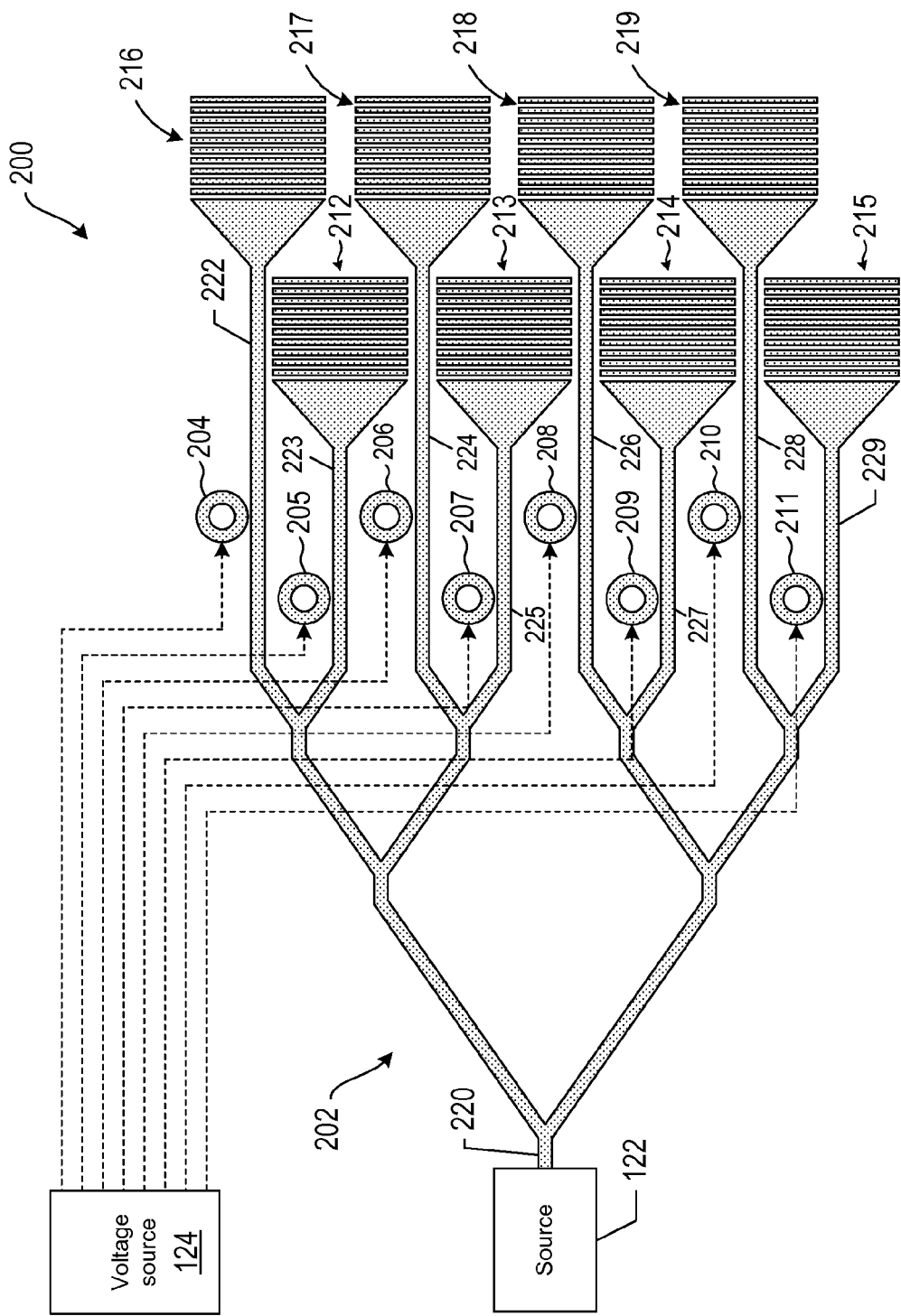
FIG. 2 shows a top-view schematic representation of an example two-dimensional wavefront synthesizer.

In the example of FIG. 1, the wavefront synthesizer 100 is referred to as a one-dimensional wavefront synthesizer because the output couplers 108-111 are aligned. Wavefront synthesizers are not intended to be limited to a one-dimensional output coupler arrangement. FIG. 2 shows a top-view schematic representation of an example two-dimensional wavefront synthesizer 200. The synthesizer 200 includes a waveguide tree 202, eight microring resonators 204-211, and eight output couplers 212-219. The waveguide tree 202 has a symmetric binary tree structure including a root waveguide 220 that branches symmetrically via intermediate waveguides into terminus waveguides 222-229. Each terminus waveguide terminates at one of the output couplers 212-219. The wavefront synthesizer 200 is referred to as two-dimensional because the output couplers 212-219 are aligned in two separate columns.

Wavefront synthesizer configurations are not intended to be limited to the two example wavefront synthesizers 100 and 200. One-dimensional wavefront synthesizers can include a single column with as few a two output couplers or more than four output couplers. Two-dimensional wavefront synthesizers can include two or more columns of output couplers, each column having at least two output couplers.

The wavefront synthesizers can be formed in a single elemental semiconductor, such as silicon ("Si") and germanium ("Ge"), or a compound semiconductor, such as III-V compound semiconductor, where Roman numerals III and V represent elements in the IIIa and Va columns of the Periodic Table of the Elements. Compound semiconductors can be composed of column IIIa elements, such as aluminum ("Al"), gallium ("Ga"), and indium ("In"), in combination with column Va elements, such as nitrogen ("N"), phosphorus ("P"), arsenic ("As"), and antimony ("Sb"). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The wavefront synthesizers can be formed by first depositing a high refractive index material on a lower refractive index material, such as $SiO_2$ or $Al_2O_3$, that serves as the substrate and as a lower cladding layer. The waveguides, microrings, and output couplers can be formed in the higher refractive index material using various lithographic and/or etching techniques, such as nanoimprint lithography or reactive ion etching. The wavefront synthesizer can have an air cladding or can be covered by a lower refractive index material that serves as an upper cladding layer.

As shown in the examples of FIGS. 1 and 2, the wavefront synthesizers are integrated with a source 122 connected directly to the root waveguides 114 and 220. The source 122 can be a semiconductor laser that injects an unmodulated channel of electromagnetic radiation into the root waveguide, or the source 122 can be an optical signal source that injects an optical signal into the root waveguide. A channel can be a single frequency of electromagnetic radiation or a narrow band of electromagnetic radiation centered about a particular frequency. An optical signal encodes information in high and low amplitude states or phase changes of a channel. For example, each high amplitude portion of an optical signal can represent a logic bit value "1" and each low amplitude portion of the same optical signal can represent a logic bit value "0," or vice versa.

The output couplers 108-111 each have an adiabatic taper and a sub-wavelength grating. Light is emitted from each output coupler with a nearly spherical wavefront. Consider, for example, the output coupler 108, which includes an adiabatic taper 126 located at the end of the waveguide 117 and a sub-wavelength grating 128. FIGS. 3A-3B show enlarged perspective and side views, respectively, of the output coupler 108 located at the end of the waveguide 117. The grating 128 is composed of a series of lines 302 separated by grooves 304 and is referred to as a sub-wavelength grating because the wavelength λ of the light output from the source and reaching the output coupler 108 is greater than the line width ρ of the lines 302 and the pitch P of the grating 128. As shown in FIG. 3A, the adiabatic taper 126 enables light 306 to spread out as the light enters the grating 128 and is emitted 308 out of the plane of the grating 128. As shown in FIG. 3B, light is output from the grating 128 with a spherical wavefront represented by hemispherical contours 310.

Note that in FIG. 3B the spherical wavefront 310 represents an idealized representation of the light output from the grating 128 as having both temporal and spatial coherence. In practice, although the spatial coherence, characterized by the hemispherical shape of the wavefronts 310, can be maintained for short distances above the grating 128, the temporal coherence may not. In practice, the light output from the source 128 is quasimonochromatic because of the granular nature of the emission generating light with a laser. In other words, the light output from the source 122 oscillates in a regular sinusoidal manner without interruption for a period of time, such as about 10 ns or longer, before the light randomly changes phase. This time interval over which the light field oscillates in an uninterrupted manner is the coherence time and is a measure of the temporal coherence. The corresponding spatial extent over which the light output from the source 122 oscillates in this regular sinusoidal manner is the coherence length and is another measure of the temporal coherence. As a result, the light generated by the source 122 is output from the grating 128 with only partial temporal coherence.

The symmetric binary tree structure of the branching waveguides 102 ensures that at each branch point the light propagating in the waveguides is split into two waveguides with nearly equal irradiance, and the light enters and propagates along any two branching waveguides with the same temporal coherence. As a result, the output couplers 108-111 output light with approximately the same irradiance and the same temporal coherence and, because the output couplers 108-111 are nearly identically configured, the output couplers 108-111 output light with the same spatially coherent spherical wavefront. The light output from the output couplers 108-111 is said to be mutual coherent.

Figure 4:
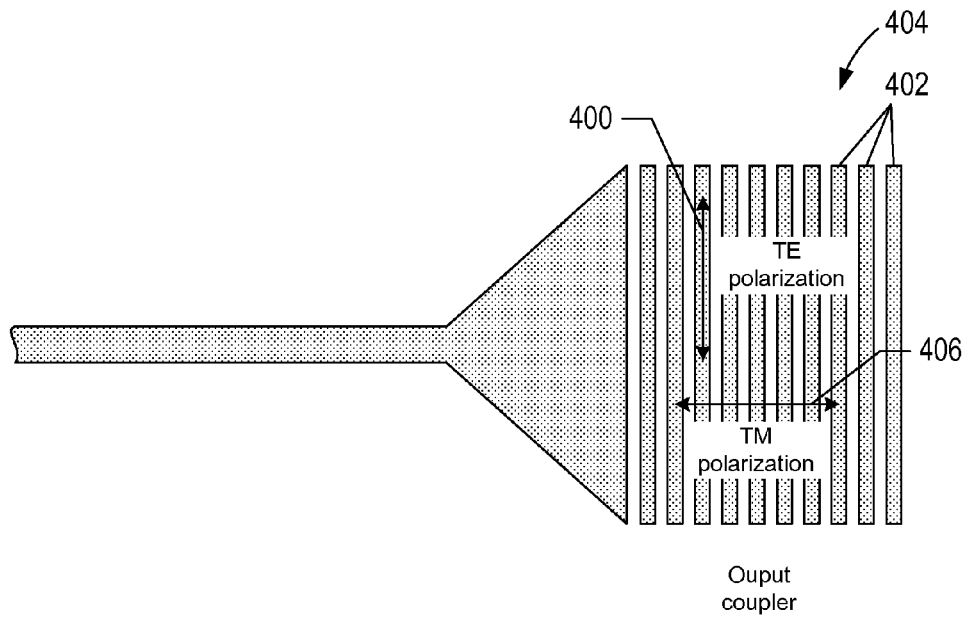
FIG. 4 shows a top view of an example output coupler and two orthogonal polarization components.

The light emitted from the sub-wavelength grating of an output coupler is also polarized, depending on how the grating of the output coupler is configured. FIG. 4 shows a top view of an example output coupler where TE and TM polarizations are represented. By convention, TE polarization refers to light polarized with the electric field component 400 directed parallel to the lines 402 of the grating 404, and TM polarization refers to light polarized with the electric field component 406 directed perpendicular to the lines 402 of the grating 404. The height of the lines 402 and duty cycle, ρ/P, of the grating 404 can be selected so that the grating 404 outputs light that is TE polarized or TM polarized, or the grating 404 can be configured to output light with a polarization that is a linear combination of TE and TM polarization.

Returning to FIGS. 1 and 2, note that the lines of the gratings of the output couplers are all configured in the same manner. As a result, the output couplers 108-111 output light with the same polarization.

Figure 5:
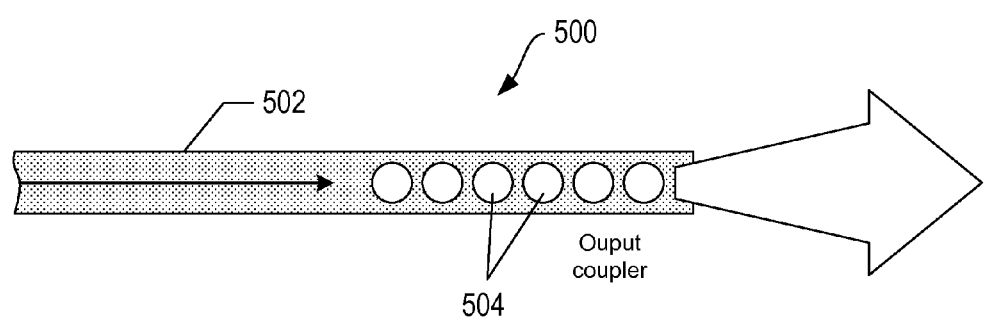
FIG. 5 shows a top view of an example output coupler formed in the end portion of a terminus waveguide.

Wavefront synthesizers are not limited to being implemented with the output couplers 108-111. Alternatively, wavefront synthesizers can be implemented with a one-dimensional grating composed of a series of regularly spaced holes formed near the end of the terminus waveguides. FIG. 5 shows a top view of an example output coupler 500 formed in the end portion of a terminus waveguide 502. The output coupler 500 is composed of a series of circular-shaped holes 504 formed in the terminus waveguide 502. The terminus waveguide 502 can represent one of the waveguides 108-111 with the series of holes 504 replacing the output coupler described above. The light output from the output coupler 500 as has a spherical wavefront, as described above with reference to FIG. 3B.

Returning to FIG. 1, the synthesizers 100 and 200 also include a voltage source 124 that is electronically connected to each of the microrings. Each microring is configured to have partial resonance with the channel of the light injected by the source 122 into the branching waveguides. The voltage source 124 can be operated by an electronically connected computing device (not shown), such as a processor, to independently apply an appropriate voltage to each microring. The applied voltage is used to tune the resonance frequency of the microring such that the resonance of the microring can be shifted closer into resonance with the channel or shifted away from resonance with the channel.

Figure 6:
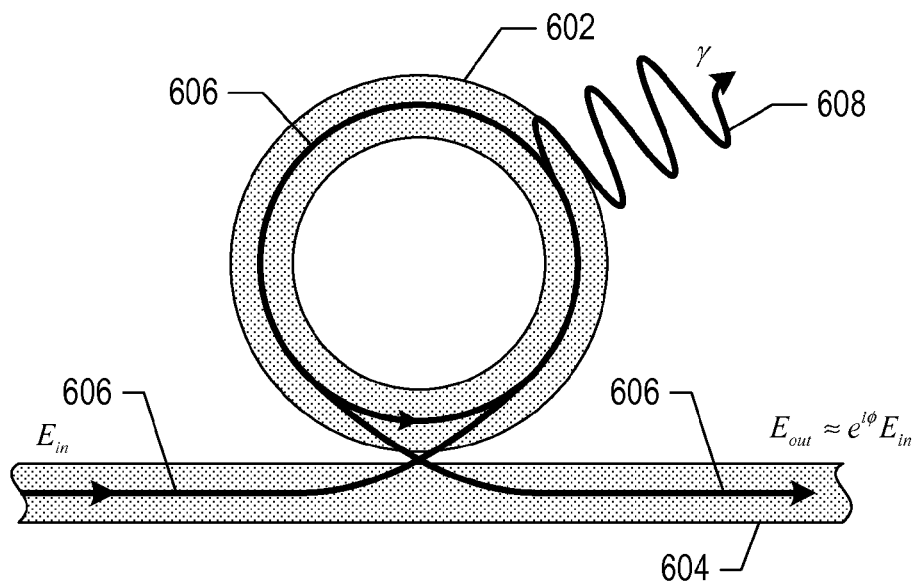
FIG. 6 shows a top view of an example microring and a portion of an adjacent terminus waveguide.

FIG. 6 shows a top view of an example microring 602 and a portion of an adjacent terminus ridge waveguide 604. Resonance frequencies of the microring 602 satisfy the resonance condition:

$$f_m = \frac{mc}{np}$$

where n is the effective refractive index of the microring 602, p is the effective perimeter of the microring 602, m is a positive integer indicating the order of the resonance and is referred to as the axial mode or simply "mode" of the resonator 602, and c is the free space speed of light. When light with a frequency f is near the resonance frequency $f_m$ of the microring 602 the light is evanescently coupled from the waveguide 604 into microring 602 but only for a period of time before being evanescently coupled back into the waveguide 604. The microring 602 is said to have "partial resonance" with the light, and the light is said to be "over coupled." FIG. 6 shows light represented by a directional line 606 over coupled from the waveguide 604 in the microring 602. The light circulates within the microring 602 for a period of time with some internal loss 608 before being evanescently being coupled back into the waveguide 604. On the other hand, when the resonance frequency $f_m$ of the microring 602 approximately matches the frequency f of the light carried by the waveguide 604 (i.e., f≈$f_m$), the light is evanescently coupled into the microring 602, remains trapped, and dissipates via internal losses. In other words, the light is said to be "critically coupled" from the waveguide 604 into the microring 602 because the light is prevented from propagating in the waveguide beyond the microring 602.

The value of the resonance frequency $f_m$ of the microring 602 shifts when the mode index m, effective perimeter p, and/or the effective refractive index n change. When these variations are small the Taylor expansion of the resonance frequency is $$\frac{\delta f_m}{f_m} = \frac{\delta m}{m} - \frac{\delta p}{p} - \frac{\delta n}{n}$$

where the effective refractive index n=n(f,T,q) varies due to changes in the frequency f, the temperature T, and the local carrier density q. Combining the Taylor expansion of the resonance frequency with the differential of n $$\delta n = \frac{\partial n}{\partial f} \delta f + \frac{\partial n}{\partial T} \delta T + \frac{\partial n}{\partial q} \delta q$$

gives the fractional shift in the resonance frequency of mode m:

$$\frac{\delta f_m}{f_m} = \frac{n}{n_g} \left[ \frac{\delta m}{m} - \frac{\delta p}{p} \right] - \frac{1}{n_g} \left[ \frac{\partial n}{\partial T} \delta T + \frac{\partial n}{\partial q} \delta q \right]$$

where $n_g$=n+f∂n/∂f is the effective group refractive index.

Microrings can be composed of semiconductor materials that exhibit electro-optic behavior. The effective refractive index of an electro-optic material is changed when an electric field is applied to the material or charge carriers are injected into the material. For example, the resonance frequency shift of the microring 602 can be expressed as:

$$\frac{\delta f_m}{f_m} = -\frac{1}{n_g} \frac{\partial n}{\partial q} \delta q$$

where δm=0 and δT=0 in the expression for the fractional shift in the resonance frequency. The resonance frequency of the microring 602 can be changed by injecting current into the microring (i.e., current tuning) or by applying a voltage to the microring (i.e., electro-optic tuning). Both processes are referred to as "electronic tuning."

The effective refractive index n changes and the effective perimeter p of the microring 602 may change when the temperature of the microring 602 changes. According to the resonance condition, because the resonance frequency $f_m$ is a function of the effective perimeter p and the effective refractive index n, changing the effective refractive index and/or the perimeter produces a corresponding change in the resonance frequency of the microring 602. For example, a shift in the resonance frequency can be expressed as:

$$\frac{\delta f_m}{f_m} = -\frac{\delta T}{n_g} \left[ \frac{n}{p} \frac{\partial p}{\partial T} + \frac{\partial n}{\partial T} \right]$$

where p=p(T), δm=0 and δq=0 in the expression for the fractional shift in the resonance frequency. A change in the perimeter p can be ignored for certain materials such as Si (i.e., δp=0). Because the effective refractive index n, and possibly the effective perimeter p, of the microring 602 can be changed by varying the microring 602 temperature, the resonance frequency of the microring can be changed by applying heat or allowing heat to dissipate from the microring in a process called "thermal tuning."

The transmittance of light carried by the waveguide 604 and passing the microring 602 can be characterized by the expression $$\frac{E_{out}}{E_{in}} \approx 1 - \frac{\kappa}{-i\Delta + \frac{\kappa+\gamma}{2}}$$

where $E_{in}$ is the complex representation of an electromagnetic wave prior to reaching the microring 602, $E_{out}$ is the complex represents of the electromagnetic wave after the microring 602, the ratio $E_{out}/E_{in}$ represents the transmittance, κ is the microring-to-waveguide coupling, Δ is the microring detuning from the frequency f of the light, and γ is the internal loss of the microring 602 represented by a wave 608 emitted from the microring 602 in FIG. 6.

Note that when the microring 602 is configured and tuned to critically couple light from the waveguide 604 into the microring 602, Δ≈0 (i.e., f≈$f_m$) and κ≈γ and the transmittance is approximately zero (i.e., $E_{out}$≈0). On the other hand, when the microring 602 is configured to over couple light from the waveguide 604 into the microring 602, κ☐γ and the electromagnetic wave after the microring 602 acquires a phase shift φ:

$$E_{out} \approx e^{i\phi} E_{in}$$

where $$\phi = 2\text{Arctan}\left(\frac{2\Delta}{\kappa}\right).$$

Figure 7:
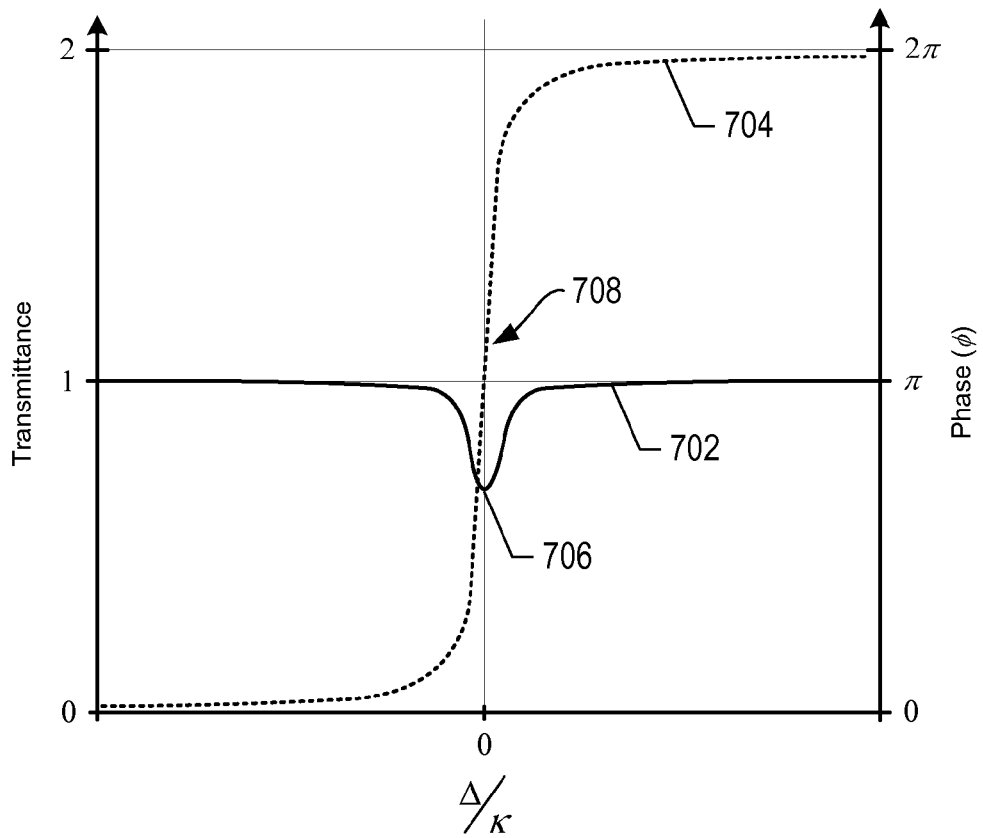
FIG. 7 shows a plot of transmittance and phase versus $\lambda/K$ associated with over coupling light from a waveguide into an adjacent microring.

FIG. 7 shows a plot of transmittance and phase versus Δ/κ for the example microring 602 tuned to over couple light from the waveguide 604 into the microring 602. In FIG. 7, the transmittance $E_{out}/E_{in}$ is represented by solid curve 702 and the phase shift φ is represented by dashed curve 704. Curves 702 and 704 reveal how the transmittance is affected when tuning the microring 602 to produce a particular phase shift in the electromagnetic wave 606. When the microring 602 is tuned so that the electromagnetic wave acquires a phase shift of approximately 0 (i.e., Δ<0) or approximately 2π (i.e., Δ>0), |Δ|/κ is large and the transmittance approaches a maximum of "1." When the microring 602 is tuned so that the electromagnetic wave acquires a phase shift of π, Δ≈0 and the transmittance is at the minimum 706. When the microring 602 can be precisely tuned so that the electromagnetic wave acquires a phase shift between 0 and 2π characterized by the steep portion 708 of the curve 704, Δ/κ is near "0" and the transmittance lies between "1" and the minimum 706.

Figure 8A:
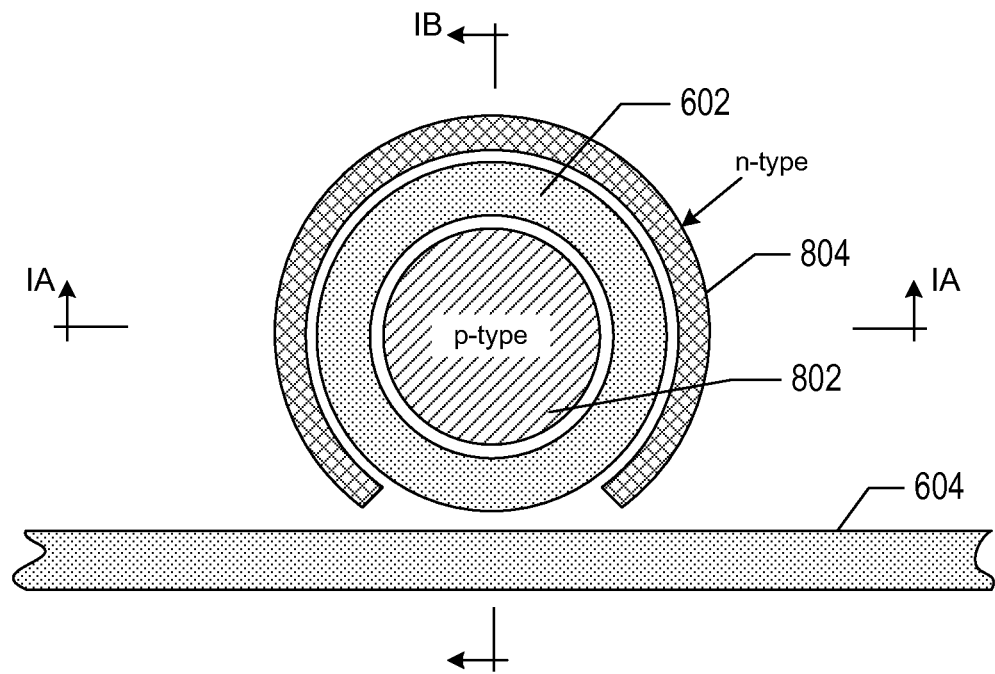
FIGS. 8A-8C show schematic representations of example doped regions located adjacent to a microring.
Figure 8B:
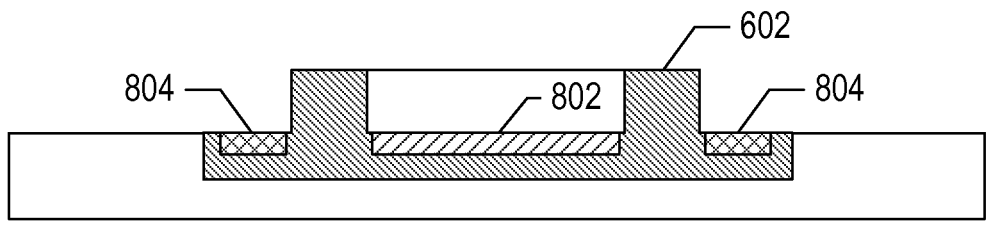
Figure 8C:
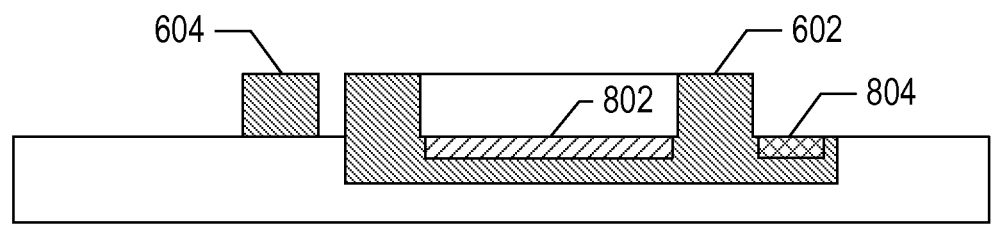

The microring 602 can be configured for electronic tuning by doping regions of the substrate surrounding the microring 602 with appropriate electron donor and electron acceptor atoms or impurities. FIG. 8A shows a schematic representation and top view of doped regions surrounding the microring 602. FIGS. 8B-8C show two different cross-sectional views of the microring 602 along line IA-IA and IB-IB in FIG. 8A. In this example, the microring 602 is composed of an intrinsic semiconductor. A p-type semiconductor region 802 can be formed in the substrate interior of the microring 602, and an n-type semiconductor 804 can be formed in the semiconductor substrate surrounding the outside of the microring 602. The p-type region 802 and the n-type regions 804 form a p-i-n junction with the microring 602. In other examples, the dopants can be reversed in order to form an n-type semiconductor region in the substrate interior of the microring 602 and a p-type semiconductor region in the substrate surrounding the outside of the microring 602.

Figure 9A:
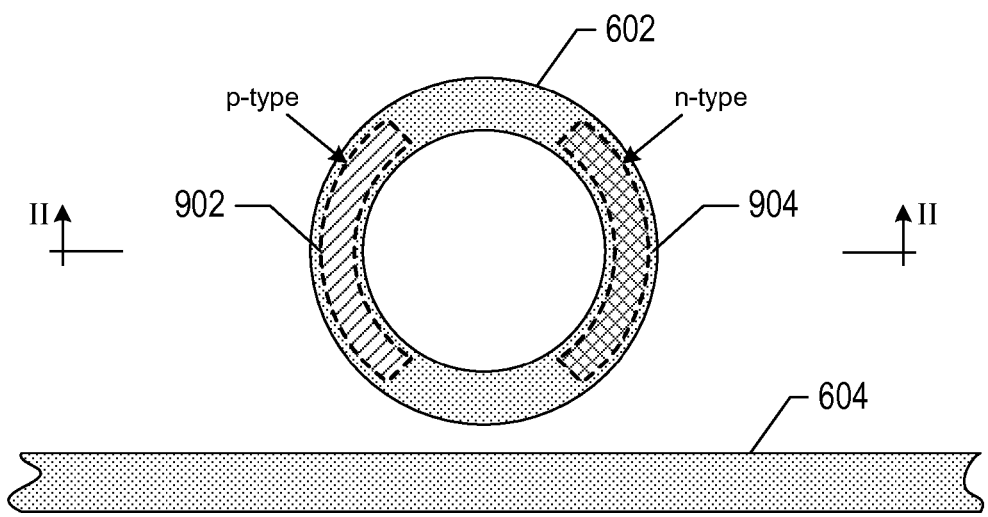
FIGS. 9A-9B show schematic representations of example doped regions beneath a portion of a microring.
Figure 9B:
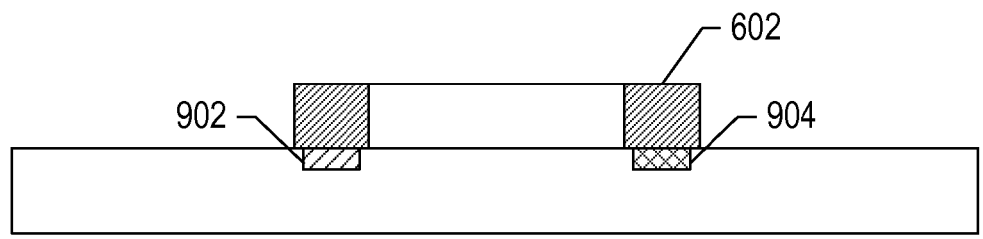

FIG. 9A shows a schematic representation and a top view of the doped regions beneath the microring 602. FIG. 9B shows a cross-sectional view of the microring 602 along a line II-II in FIG. 9A. In this example, the microring 602 is also composed of an intrinsic semiconductor. A p-type semiconductor region 902 is formed in the semiconductor substrate beneath a portion of the microring 602 and an n-type semiconductor region 904 is formed in the semiconductor substrate beneath a different portion of the microring 602. The p-type region 902 and the n-type region 904 form a p-i-n junction with the microring 602.

P-type impurities can be atoms that introduce vacant electronic energy levels called "holes" to the electronic band gaps of the microring 602. These impurities are also called "electron acceptors." N-type impurities can be atoms that introduce filled electronic energy levels to the electronic band gap of the microring 602. These impurities are called "electron donors." For example, boron ("B"), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities.

The microring 602 p-i-n junctions represented in FIGS. 8 and 9 can be operated in forward- or reverse-bias modes. Under a forward bias, a change in the effective refractive index of the microring 602 is induced through current injection. Under a reverse bias, an electrical field can be formed across the microring 602 and a refractive index change can result from the electro-optic effect or charge depletion effect. Both of these electronic tuning techniques typically provide a relatively small shift in the effective refractive index of the microring 602.

Figure 10A:
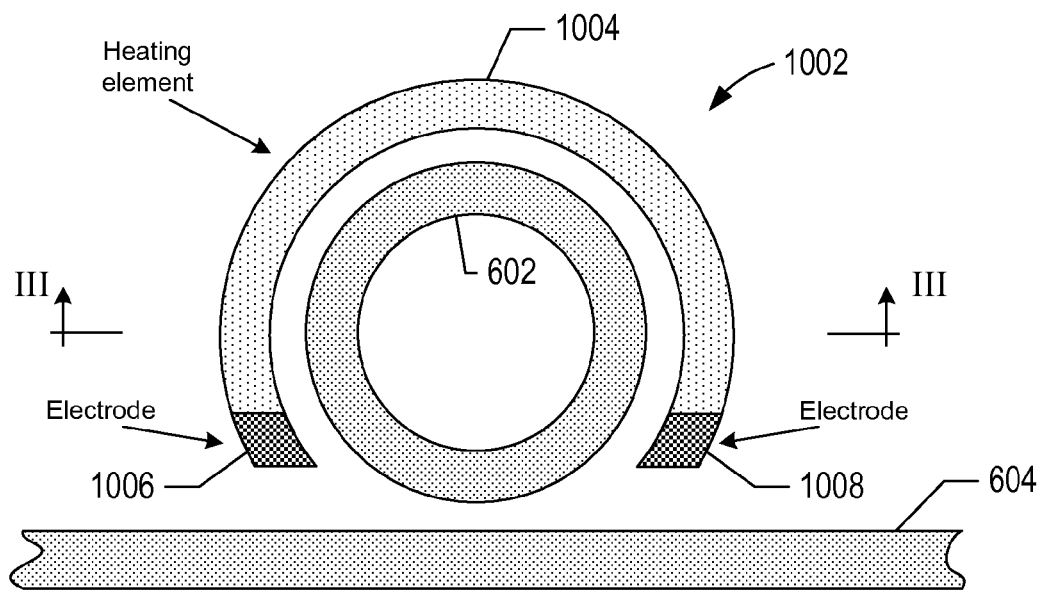
FIGS. 10A-10C show schematic representations of an example heating element partially surrounding a microring.

The microring 602 can be thermally tuned by applying heat directly to the microring 602 or applying heat to a region surrounding the microring 602. FIG. 10A shows a schematic representation and top view of an example heating element 1002 composed of a resistive region 1004 partially surrounding the microring 602 and electrodes 1006 and 1008 located at the ends of the region 1008. The heating element 1004 is composed of materials that through the process of Joule heating convert electrical current supplied via a variable current control into heat. In certain examples, the element 1004 can be composed of a p-type semiconductor or an n-type semiconductor, and the contacts 1006 and 1008 can be composed of a metal, such as gold, silver, platinum, copper, or another suitable conductor. In other examples, the contacts 1006 and 1008 can be omitted and the element 1004 can be composed of platinum, nichrome, silicon carbide, molybdenum disilicide, or another suitable metal or alloy that through resistance converts electrical current into heat.

Figure 10B:
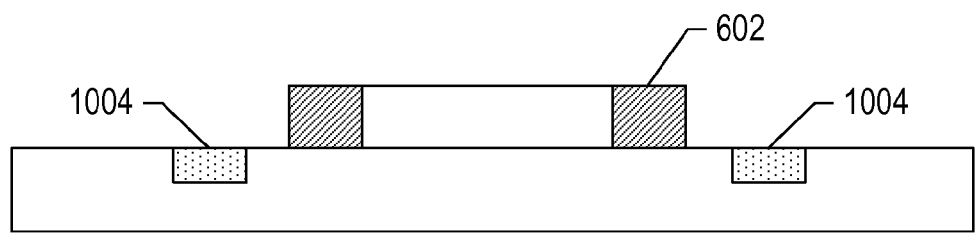
Figure 10C:
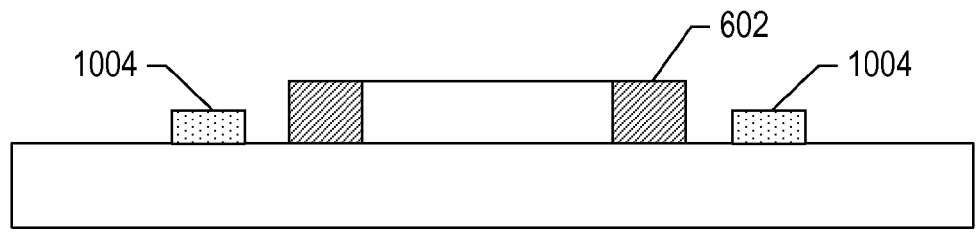

In certain examples, the heating element 1002 can be formed within the substrate or the heating element can be disposed on the surface of the substrate. FIGS. 10B-10C show cross-sectional views of the microring 602 shown in FIG. 10 along a line III-III. In the example of FIG. 10B, the element 1004 is embedded within the substrate. In the example of FIG. 10C, the element 1004 is disposed on the substrate.

Figure 11A:
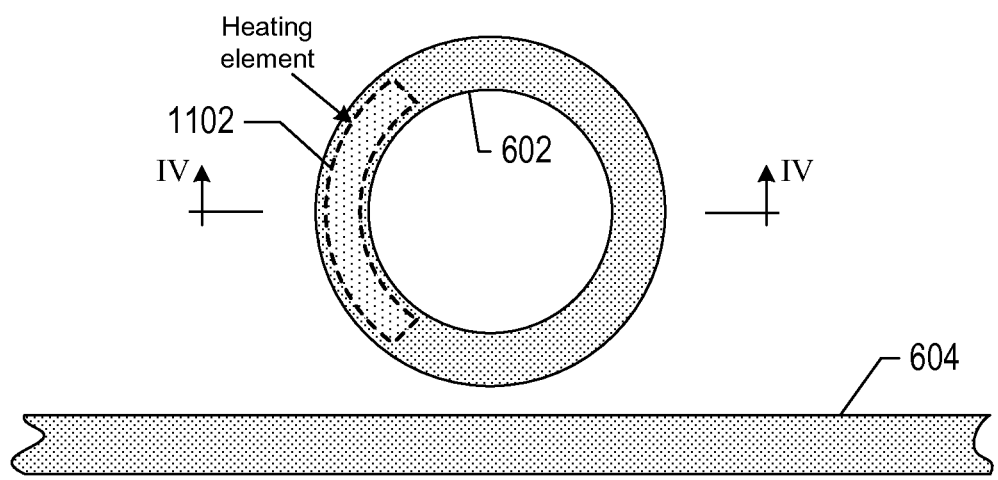
FIGS. 11A-11B show schematic representations of a heating element embedded beneath a portion of a microring.
Figure 11B:
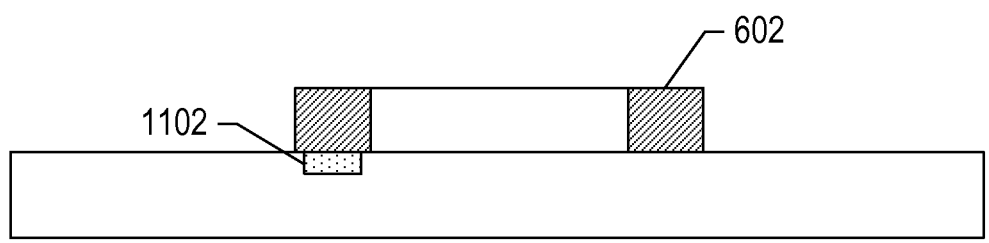

The heating element can also be located in other locations near the resonator. FIG. 11A shows a schematic representation and top view of a heating element 1102 embedded within the substrate beneath a portion of the microring 602. FIG. 11B shows a cross-sectional view of the microring 602 and heating element 1102 along a line IV-IV in FIG. 11A.

Microrings can be electronically and thermally tuned by combining the elements described above with reference to FIGS. 8-11. For example, the p- and n-type regions 902 and 904 described above with reference to FIG. 9 can be combined with the heating element 1002 described above with reference to FIG. 10. Alternatively, the p- and n-type regions 802 and 804 described above with reference to FIG. 8 can be combined with the heating element 1102 described above with reference to FIG. 11.

Returning to FIG. 1, a microring can be tuned to over couple the light transmitted along a terminus waveguide so that the light is output from the output coupler with a particular phase shift $\phi$. FIG. 12 show a top-view of an example microring 1202 located adjacent to a terminus waveguide 1204 and an output coupler 1206 located at the end of the terminus waveguide 1204. The microring 1202 is tuned to over couple an electromagnetic wave $E_{in}$ 1208 into the microring 1202 to produce a phase shift $\phi$ in the wave $E_{out} \approx e^{i\phi} E_{in}$ entering the output coupler 1206, as described above with reference to FIGS. 6 and 7. The electromagnetic wave $E_{out}$ output 1210 from the output coupler 1206 with a spherical wavefront and is polarized, as described above with reference to FIGS. 3 and 4.

Note that the microring 1202 can also be electronically and/or thermally tuned to critically couple the electromagnetic wave $E_{in}$ 1208 from the waveguide 1204, effectively preventing any light at the frequency associated with the wave 1208 from being output from the output coupler 1206.

FIG. 13 shows an example of an alternative tuning device 1302 for applying a phase shift $\phi$ in an electromagnetic wave transmitted along a terminus waveguide 1304 to an output coupler 1306. The tuning device 1302 includes a p-type semiconductor region 1308 formed in the substrate adjacent to the waveguide 1304 and an n-type semiconductor region 1310 formed in the substrate adjacent to the waveguide 1304 opposite the n-type region 1310. The regions 1308 and 1310 and the portion of the waveguide 1304 located between the regions 1308 and 1310 form a p-i-n junction. Applying an appropriate voltage to the regions 1308 and 1310 changes the refractive index of the waveguide 1304 located between the regions 1308 and 1310. An electromagnetic wave $E_{in}$ 1312 enters the waveguide 1304 between the regions 1308 and 1310 with a phase velocity $v=c/n$, where n in the refractive index of the waveguide 1304. When current is injected into the waveguide 1304, the refractive index of the waveguide 1304 between the regions 1308 and 1310 increases to n' and the electromagnetic wave slows to $v'=c/n'$, acquiring a phase shift $\phi$. The electromagnetic wave $E_{out}$ output 1312 from the output coupler 1306 with a spherical wavefront and is polarized, as described above with reference to FIGS. 3 and 4. Alternatively, one or both of the regions 1308 and 1310 can be resistive elements, as described above with reference to FIGS. 10 and 11, and thermal tuning can be used to shift the refractive of index n of the portion of the waveguide 1304 between the regions 1308 and 1310 to the refractive index n'.

Figure 14:
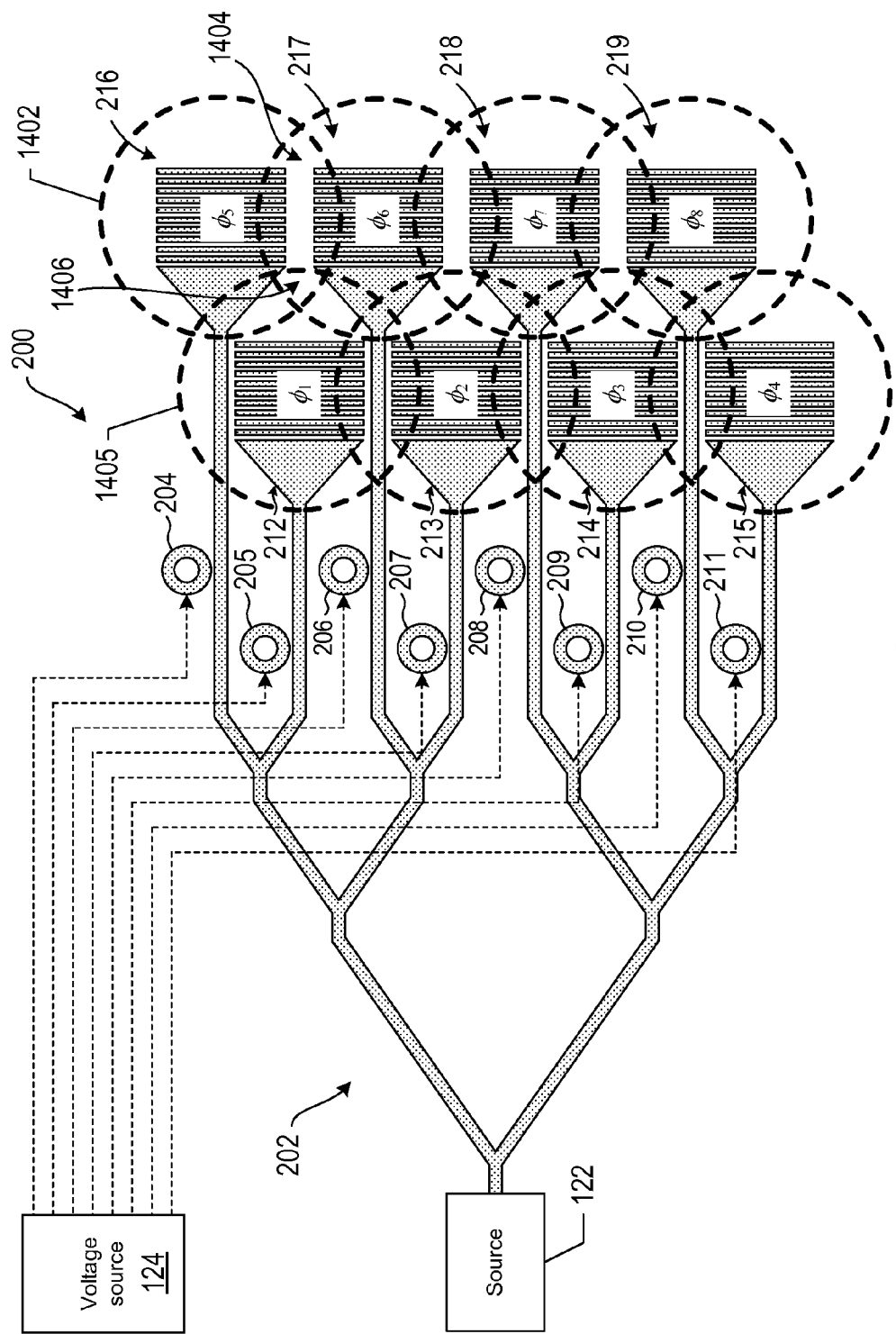
FIG. 14 shows an example of overlap between wavefronts output from neighboring output couplers of a two-dimensional wavefront synthesizer.

FIG. 14 shows an example of overlap between the wavefronts output from each of the output couplers 212-219 at a certain distance above the plane of the two-dimensional wavefront synthesizer 200. At the distance shown in FIG. 14, the spread of the wavefronts above the plane of the synthesizer 200 are represented by dashed-line circles and only portions of the wavefronts output from neighboring output couplers are depicted as overlapping. For example, the wavefronts 1402 and 1403 output from the output couplers 216 and 217, respectively, produce an overlap region 1404. The wavefronts 1402 and 1403 overlap with the wavefront 1405 output from the output coupler 212 to produce an overlap region 1406. At distances farther from the plane of the synthesizer 200, the wavefronts from non-neighboring output couplers overlap. For example, at a distance farther from the synthesizer 200 shown in FIG. 14, the wavefronts output from the three output couplers 212-214 overlap. The microrings 204-211 can be electronically and/or thermally tuned, as described above with reference to FIG. 12, to independently produce a separate phase shift, $\phi_i$, where i is a positive integer, in each of the wavefronts output from the output couplers 212-219 or effectively shut off the light output from an associated output coupler.

Because the wavefronts output from the output couplers are mutually coherent and have the same polarization, the overlap regions create mutually coherent beams of light. The microrings can be tuned to steer the direction of the beams. FIG. 15A shows example wavefronts output from couplers 1501-1504 of a wavefront synthesizer 1500. The output couplers 1501-1504 are disposed on a lower refractive index substrate 1506. The wavefront synthesizer 1500 can be a one-dimensional or a two-dimensional wavefront synthesizer as described above. In the example of FIG. 15A, the microrings associated with the output couplers 1501 and 1504 are tuned to critically couple light from the associated terminus waveguides so that effectively no light is output from output couplers 1501 and 1504. On the other hand, the microrings associated with the output couplers 1502 and 1503 are tuned to over couple light from the associated terminus waveguides and produce wavefronts 1508 and 1510 with the same phase shift $\phi$. Because the wavefronts 1508 and 1510 output from the output couplers 1502 and 1503, respectively, are mutually coherent and have the same polarization, the wavefronts 1508 and 1510 have regions of constructive interference (i.e., overlapping crest and troughs) that form beams of light depicted in FIG. 15A by shaded regions 1512-1514 and have regions of destructive interference between the beams 1512-1514. The alternating constructive and destructive regions form an interference pattern 1516. In practice, the interference pattern 1516 is composed of a series of alternating light and dark bands, where light bands correspond to the beams 1512-1514 and dark bands correspond to destructive interference of the wavefronts 1508 and 1510 between and around the beams 1512-1514. The irradiance of the three light beams 1512-1514 are represented by peaks 1518-1520, where central peak 1519 corresponds to the central beam 1513, which has the largest irradiance or strongest constructive interference.

In the example of FIG. 15A, the wavefronts are output with the same phase $\phi$. As a result, the central beam 1513 is directed perpendicular to the plane of the wavefront synthesizer. FIG. 15B shows the wavefronts 1508 and 1510, shown in FIG. 15A, expanding outward from the output couplers 1502 and 1503 with the same phase $\phi$ which appear to merge into combined wavefronts 1522 that flattens and propagates away from the output couplers 1502 and 1503 in the direction 1524 perpendicular to the planar surface of the wavefront synthesizer 1500. In other words, by selecting the wavefronts to be output with the same phase $\phi$, the central beam 1513 and the combined wavefronts 1522 are steered in the direction 1524.

Figure 15C:
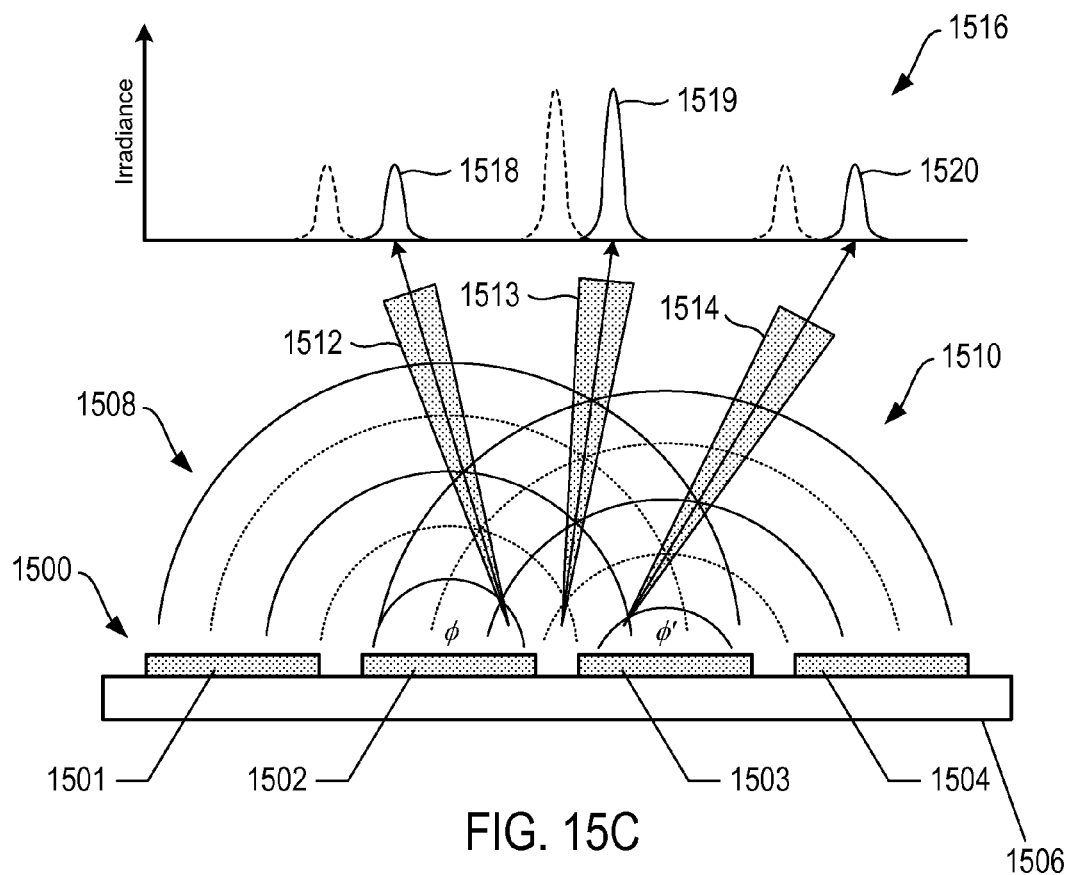

The constructive interference beams and combined wavefronts propagate can be steered in a different direction by changing the relative phase in which the wavefronts are output from the output couplers. FIG. 15C shows example of steered interfering wavefronts. As shown in FIG. 15B, the microrings associated with the output couplers 1501 and 1504 are still tuned to critically couple light from the associated terminus waveguides and the microring associated with the output coupler 1502 is tuned to over couple light from the associated terminus waveguide to produce wavefront 1508 with the phase shift $\phi$. But, the microring associated with the output coupler 1503 is tuned to over couple light from the associated waveguide to produce the wavefront 1510 with the phase shift $\phi'$, which is greater than the phase shift $\phi$. As a result, the beams of light 1512-1514 produced by constructive interference are steered in the direction of the larger phase shift $\phi'$. The interference pattern 1516 is also shifted from the previous location of the interference pattern represented by dashed-line peaks, originally shown in FIG. 15A.

Figure 15D:
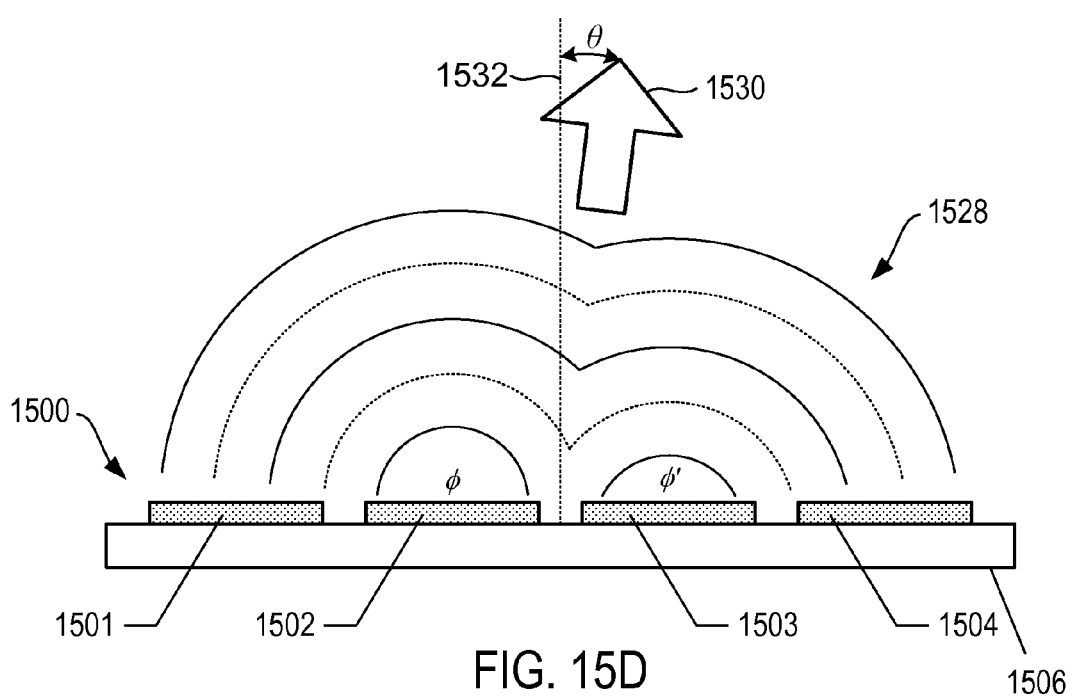

In the example of FIG. 15C, the wavefronts are output with different phases shifts $\phi$ and $\phi'$ ($\phi<\phi'$) and the central beam 1513 points in the direction of increasing phase along the row of output couplers 1501-1504. FIG. 15D shows the wavefronts 1508 and 1510, shown in FIG. 15C, expanding outward from the output couplers 1502 and 1503 with the different phases $\phi$ and $\phi'$ which appear to merge into combined wavefronts 1528 that flattens and propagates away from the output couplers 1502 and 1503 in a direction 1530 away from normal 1532 with the angle $\theta$. In other words, by selecting the wavefronts to be output with different phases $\phi$ and $\phi'$, the central beam 1513 and the combined wavefronts 1528 are steered in the direction 1530.

Figure 16A:
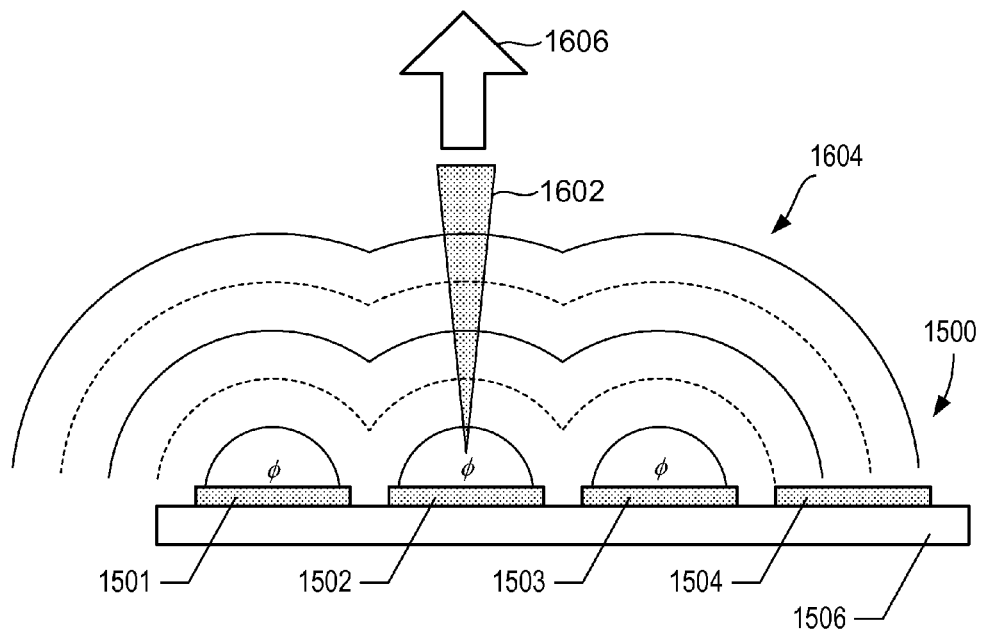
FIGS. 16A-16B show an example steering three wavefronts output from three output couplers of three output couplers of a wavefront synthesizer.
Figure 16B:
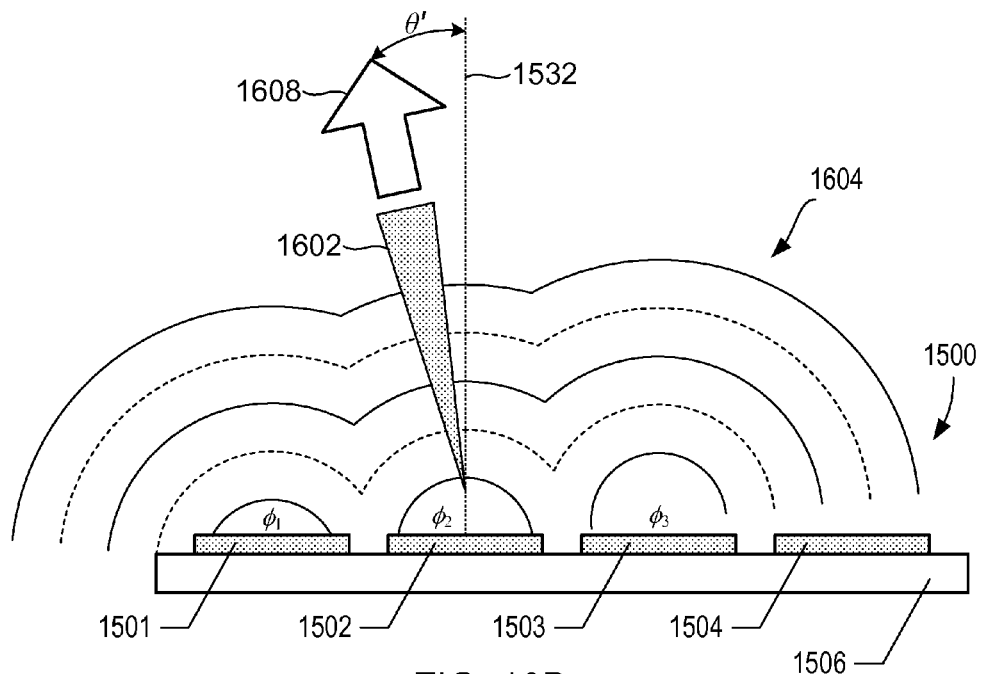

The constructive interference beams and combined wavefronts can also be steered in different directions by applying the appropriate phase shift to more than two output couplers. FIGS. 16A-16B show examples of steering a constructive central interference beam 1602 and combined wavefronts 1604 produced by three of the output couplers 1501-1504. In the example of FIG. 16A, the microrings associated with the output couplers 1501-1503 are tuned to output wavefronts with the same phase shift $\phi$ and the microring associated with the output coupler 1504 is tuned to critically couple light from the associated terminus waveguide. The three wavefronts overlap to produce constructive interference beams, such as central beam 1602, separated by regions of destructive interference (not shown), as described above with reference to FIG. 15A. The wavefronts expand outward from the output couplers 1501-1503 with the same phase $\phi$ which appear to merge into combined wavefronts 1606 that propagates in the direction 1606 perpendicular to the plane of the wavefront synthesizer 1500.

In the example of FIG. 16B, the microrings associated with the output couplers 1501-1503 are tuned to output wavefronts with phase shifts $\phi_1$, $\phi_2$, and $\phi_3$, respectively, where $\phi_1>\phi_2>\phi_3$, and the microring associated with the output coupler 1504 is tuned to critically couple light from the associated terminus waveguide. The changes in the phase shifts applied to the wavefronts output from the output couplers 1501-1503 can be preselected to steer the central beam 1602 and propagation of the combined wavefronts 1604 into a direction 1608 away from the normal 1532 by the angle $\theta'$. Note that the central beam 1602 and the combined wavefronts 1604 are steered in the direction of increasing phase shift.

Electronic tuning enables the resonance frequency of a microring to be shifted in less than a nanosecond. As a result, the central beam and combinations of wavefronts can be steered into a different direction in less than a nanosecond. These relatively fast switching speeds make wavefront synthesizers suitable for incorporation in optical switches to switch input optical signals to output waveguides. For example, an optical switch can include the wavefront synthesizers 100 and 200 described above, where the source 122 is a source of optical signals. The optical switch can include an array of optical fibers oriented so that the ends of the optical fibers face the array of output couplers.

Figure 17B:
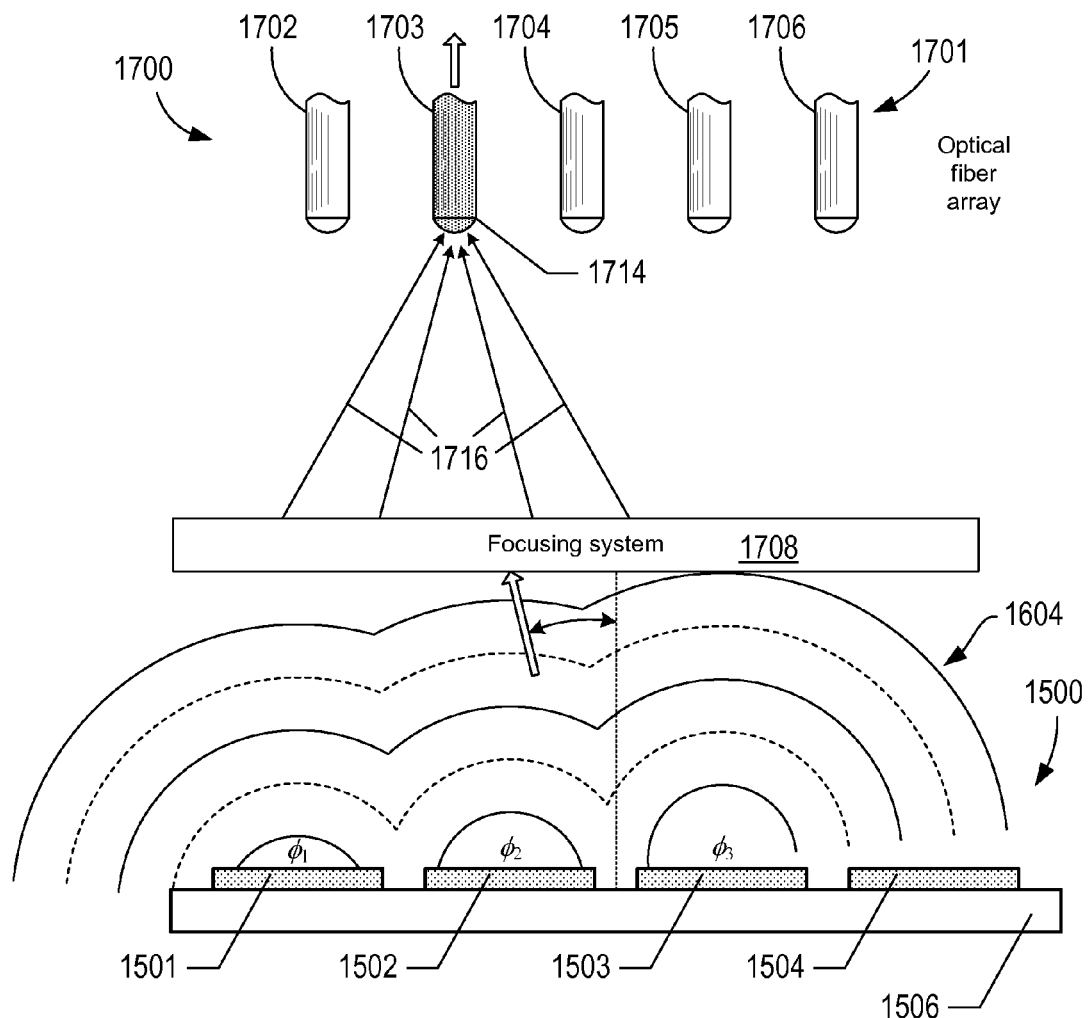

FIGS. 17A-17B show an example optical switch 1700 operated to inject an optical signal into different optical fibers of an optical fiber array. The optical switch 1700 includes the wavefront synthesizer 1500, shown in FIG. 15, and an array of optical fibers 1701 of which five optical fibers 1702-1706 are shown. The array of optical fibers 1701 can be a one-dimensional or two-dimensional array of optical fibers. The optical fibers are oriented so that the ends of the optical fibers face the array of output couplers. The end of each fiber is capped with a lens to focus incident light into the core of the fiber. The optical switch 1700 also includes a focusing system 1708 disposed between the output couplers 1704-1707 and the optical fibers 1702-1706. The focusing system 1708 can be a lens, such a biconvex lens or planar convex lens, or any number of lenses to combine the wavefronts output from the output couplers with a selected angle into one focal point in the focal plane where the wavefronts interfere. The optical fibers are positioned so that the lenses of the fibers lie in the focal plane.

In the example of FIG. 17A, the wavefront synthesizer 1500 is operated as described above with reference to FIG. 15A to apply the same phase shift to the wavefronts output from the output couplers 1501-1503. An optical signal input to the root waveguide (not shown) of the wavefront synthesizer 1500 is output from the output couplers 1501-1503 as three mutually coherent wavefronts, as represented by combined wavefronts 1522, that enter the focusing system 1708 substantially parallel to the plane of the waveguide synthesizer 1500. The focusing system 1708 combines the wavefronts into a focal point near the lens 1710 of the central optical fiber 1704, as indicated by directional arrows 1712. The wavefronts interfere and are directed by the lens 1710 into the core of the fiber 1704.

In the example of FIG. 17B, the wavefront synthesizer 1500 is operated as described above with reference to FIG. 15C to apply the phase shifts $\phi_1$, $\phi_2$, and $\phi_3$, where $\phi_1>\phi_2>\phi_3$, to steer the wavefronts output from the output couplers 1501-1503, respectively, to enter the focusing system 1708 at a different angle. As a result, the optical signal is output from the three output couplers 1501-1503 as three mutually coherent wavefronts, as represented by combined wavefronts 1604, that enter the focusing system 1708 with the angle $\theta'$. In this example, the focusing system 1708 combines the wavefronts into a focal point near the lens 1714 of the optical fiber 1703, as indicated by directional arrows 1716. The wavefronts interfere and are directed by the lens 1714 into the core of the fiber 1703.

Figure 18:
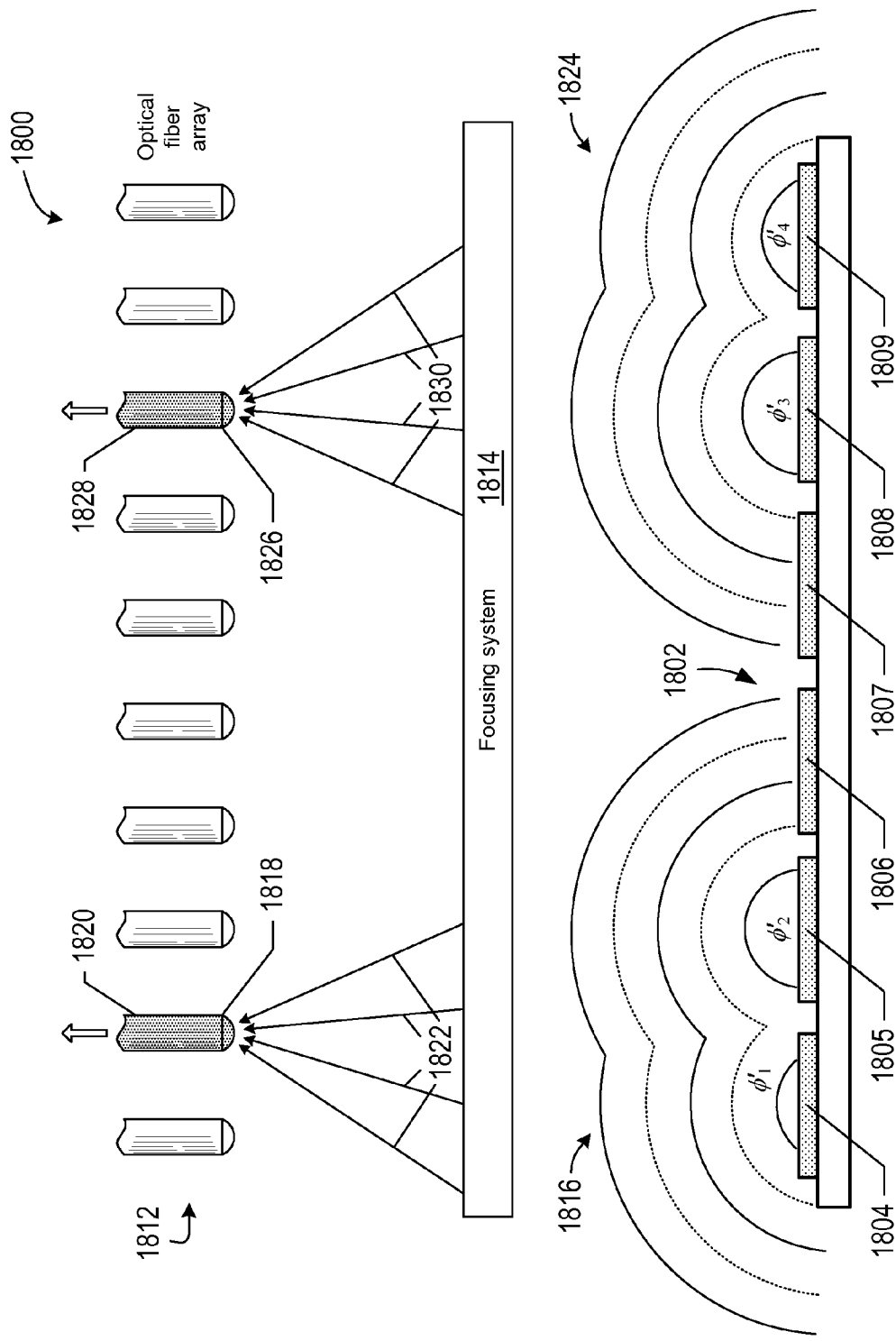
FIG. 18 shows an example optical switch operated to simultaneously inject the same optical signal into two different optical fibers.

An optical switch can be operated to direct an optical into at least two optical fibers of an optical fiber array. FIG. 18 shows an example optical switch 1800 operated to simultaneously inject the same optical signal into two different optical fibers of an optical fiber array. The optical switch 1800 includes a wavefront synthesizer 1802, of which six output couplers 1804-1809 are shown, an array of optical fibers 1812, and a focusing system 1814 disposed between the synthesizer 1802 and the array 1812. The microrings associated with the output couplers 1804, 1805, 1808 and 1809 are tuned to output wavefronts with phase shifts $\phi'_1$, $\phi'_2$, $\phi'_3$, and $\phi'_4$, respectively, where $\phi'_1>\phi'_2$ and $\phi'_4>\phi'_3$. The microrings associated with the output couplers 1806 and 1807 are tuned to critically couple the optical signal from associated terminus waveguides. The phase shifts $\phi'_1$ and $\phi'_2$ are selected so that the combined wavefronts 1816 enter the focusing system 1814 and are combined at the lens 1818 to enter the core of the optical fiber 1820, as indicated by directional arrows 1822. The phase shifts $\phi'_3$ and $\phi'_4$ are selected so that the combined wavefronts 1824 enter the focusing system 1814 and are combined at the lens 1826 to enter the core of the optical fiber 1828, as indicated by directional arrows 1830.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented for purposes of illustration and description. They are not intended to be exhaustive of or to limit this disclosure to the precise forms described. Obviously, many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

The invention claimed is:

1. A wavefront synthesizer comprising:
a waveguide tree disposed on a planar surface of a substrate, the waveguide tree including a root waveguide that branches via intermediate waveguides into at least two terminus waveguides, the root waveguide optically integrated with a source to inject light into the waveguide tree via the root waveguide;
output couplers disposed on the planar surface and located at the ends of the terminus waveguides, each output coupler to output a wavefront directed away from the planar surface and composed of a portion of the light to be injected by the source, wherein at least two of the wavefronts overlap to form at least one beam of light via constructive interference; and
microring resonators disposed on the planar surface adjacent to the terminus waveguides, each microring independently tunable to apply a phase shift to the wavefront output from one of the output couplers to steer the direction of the beam and the at least two wavefronts.

2. The synthesizer of claim 1 further comprising a voltage source electronically connected to each of the microrings to separately tune each microring.

3. The synthesizer of claim 1, wherein the waveguide tree further comprises a binary tree structure such that each intermediate waveguide branches into two waveguides.

4. The synthesizer of claim 1, wherein each output coupler further comprises an adiabatic taper and a sub-wavelength grating.

5. The synthesizer of claim 1, wherein each output coupler further comprises a series of holes formed near the end of a terminus waveguide.

6. The synthesizer of claim 1, wherein the waveguide tree and output couplers to output mutually coherent wavefronts with the same polarization.

7. The synthesizer of claim 1, wherein each microring resonator further comprise a p-i-n junction including an adjacent p-type semiconductor region and an adjacent n-type semiconductor region.

8. The synthesizer of claim 1, wherein each microring resonator further comprises an adjacent heating element.

9. An optical switch comprising:
an array of optical fibers;
a wavefront synthesizer disposed on a planar surface of a substrate and optically connected to a source; and
a focusing system disposed between the wavefront synthesizer and the array of optical fibers, wherein the wavefront synthesizer to receive an optical signal from the source and output at least two combined wavefronts at a selected angle away from the planar surface, and wherein the focusing system to receive and focus the at least two combined wavefronts to enter one of the optical fibers,
wherein the wavefront synthesizer is to apply a phase shift in the at least two combined wavefronts.

10. The switch of claim 9, wherein the wavefront synthesizer comprises:
a waveguide tree disposed on the planar surface, the waveguide tree including a root waveguide that branches via intermediate waveguides into at least two terminus waveguides, the root waveguide integrated with the source;
output couplers disposed on the planar surface and located at the ends of the terminus waveguides, each output coupler to output a wavefront directed away from the planar surface and composed of a portion of the optical signal, wherein at least two of the wavefronts overlap to form the at least one beam of light via constructive interference; and
microring resonators disposed on the planar surface adjacent to the terminus waveguides, each microring to apply the phase shift in the wavefront output from one of the output couplers to steer the direction of the beam and the at least two wavefronts.

11. The switch of claim 10 further comprising a voltage source electronically connected to each of the microrings to separately tune each microring.

12. The switch of claim 10, wherein the waveguide tree further comprises a binary tree structure such that each intermediate waveguide branches into two waveguides.

13. The switch of claim 10, wherein the waveguide tree and output couplers to output mutually coherent wavefronts with the same polarization.

14. The switch of claim 9, wherein the array of optical fibers further comprises the optical fibers oriented so that the ends of the optical fibers face output couplers of the wavefront synthesizer.

15. The switch of claim 9, wherein the focusing system further comprises at least one lens.

* * * * *